United States Patent
Wang et al.

(10) Patent No.: US 12,442,291 B1
(45) Date of Patent: Oct. 14, 2025

(54) METHOD OF ENCODING AND DECODING DOWNLINK INSTRUCTIONS BASED ON MUD FLOW RATE

(71) Applicant: Institute of Geology and Geophysics, Chinese Academy of Sciences, Beijing (CN)

(72) Inventors: Yuliang Wang, Beijing (CN); Wenxiu Zhang, Beijing (CN); Qihui Zhen, Beijing (CN); Jiansheng Du, Beijing (CN); Jing Ou, Beijing (CN); Xinzhen He, Beijing (CN); Jiwen Xiao, Beijing (CN); Hui Wu, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/896,927

(22) Filed: Sep. 26, 2024

(30) Foreign Application Priority Data

Aug. 26, 2024 (CN) .......................... 202411173354.6

(51) Int. Cl.
 *E21B 47/12* (2012.01)
 *E21B 44/06* (2006.01)
 *H04L 1/00* (2006.01)

(52) U.S. Cl.
 CPC .............. *E21B 47/12* (2013.01); *E21B 44/06* (2013.01); *H04L 1/0041* (2013.01); *H04L 1/0045* (2013.01); *H04L 1/0063* (2013.01)

(58) Field of Classification Search
 CPC .......... E21B 47/12; E21B 47/14; E21B 47/18; E21B 47/20; E21B 47/22; E21B 47/24; E21B 44/06; H04L 1/0041; H04L 1/0045; H04L 1/0063
 See application file for complete search history.

(56) References Cited

U.S. PATENT DOCUMENTS

| 7,518,950 | B2* | 4/2009 | Treviranus | ............... E21B 47/18 340/854.3 |
| 7,983,113 | B2* | 7/2011 | Krueger | ................... E21B 47/18 340/854.3 |
| 8,375,276 | B2* | 2/2013 | Geng | ..................... H04L 1/0057 714/775 |

FOREIGN PATENT DOCUMENTS

CN   103670381 A   3/2014

OTHER PUBLICATIONS

Gao Bo-yue et al., "Rotary Guided Downlink Transmission Technology", Petroleum Engineering, Nov. 2018, p. 1 23, vol. 44 No. 11.

\* cited by examiner

*Primary Examiner* — Franklin D Balseca

(57) ABSTRACT

A method of encoding and decoding downlink instructions based on mud flow rate includes an encoding method and a decoding method. The encoding method and the decoding method are configured to transmit and receive instructions by controlling the mud flow rate during drilling process. The method of encoding and decoding downlink instructions based on mud flow rate does not require a fixed threshold of voltage as a judgement standard for "0" and "1" symbols, but uses voltage change rate as a standard for judging the level transition, avoiding decoding failure caused by the inability of voltage sampling values to reach the fixed threshold after well depth is increased.

4 Claims, 2 Drawing Sheets

METHOD OF ENCODING AND DECODING DOWNLINK INSTRUCTIONS BASED ON MUD FLOW RATE

TECHNICAL FIELD

The disclosure relates to the technical filed of encoding and decoding, and more particularly to a method of encoding and decoding downlink instructions based on mud flow rate.

BACKGROUND

A rotary steerable system is one of key instruments for drilling special process wells such as high-difficulty directional wells, horizontal wells and extended-reach wells. By controlling a drilling deviation unit and adjusting a drilling direction of a drill bit, the wellbore deviation and horizontal drilling can be completed. Compared to conventional screw drilling, the rotary steerable system has stronger deviation capabilities and higher drilling efficiency, and the accuracy of trajectory control is also very high, thus the rotary steerable system has gradually become a powerful tool for oil and gas field drilling. The rotary steerable system is equipped with a drill bit at its forefront, which operates at bottomhole. To control the drilling direction, field engineers must issue instructions to adjust the drilling direction from the ground to the bottomhole. Generally, there are two methods for issuing instructions: one is to change a rotation speed of a drill pipe on the ground, the change of the rotation speed can be detected at the downhole to decode the downlink instructions; the other is to change mud flow rate on the ground, the downlink instructions are decoded at the downhole by detecting voltage changes caused by rotation speed changes of a generator. The method of changing the rotation speed requires the installation of sensors for detection, which is relatively troublesome. Additionally, due to the increasing depth of the well, stick-slip is easy to occur, preventing accurate transmission of the rotation speed to the bottomhole. Therefore, the instructions for the rotary steerable system are generally issued by changing the mud flow rate.

Issuing instructions by changing the mud flow rate requires the installation of an instruction downlink device on the ground. An instruction downlink method in the related art is to release a portion of the mud flowing into a drill pipe into a mud pit by opening a valve of the instruction downlink device, thereby reducing the mud flow rate flowing into the bottomhole. A turbine generator is installed in the rotary steerable system, and a rotation speed of the turbine generator decreases due to the reduction of the mud flow rate, which in turn reduces the amplitude of the generated voltage. Conversely, when the valve of the instruction downlink device is closed, the mud flow rate increases again, and the voltage amplitude generated by the turbine generator rises again. Therefore, by detecting high and low states of the voltage amplitude at the downhole, the instructions issued from the ground can be decoded.

In the related art, after the well depth increases, when the data symbols continuously appear with alternating "0" and "1" changes, that is, when the instruction downlink device on the ground is continuously turned on and off, due to the increased well depth, the change in the mud flow rate is transmitted more slowly, resulting in the voltage waveform at the downhole not reaching the standard voltage judgment threshold, thus leading to decoding failure. Despite increasing the time for which the valve is opened and closed to improve this situation, the above problem is not fully resolved. Moreover, as the well depth increases, a longer downlink time is necessary, which decreases drilling efficiency. At the same time, due to the voltage changes having a certain rise time and fall time, it is difficult to count the duration of a single bit (8-second pulse width), which generally cannot reach 8 seconds. Depending on the well depth, the pulse width time varies, and inaccurate pulse width judgment can also lead to decoding failure.

SUMMARY

In order to address the issue of decoding failure in deep wells, the disclosure aims to employ a new synchronization header encoding method and downhole decoding method.

The technical solution of the disclosure is as follows.

A method of encoding and decoding downlink instructions based on mud flow rate, includes: an encoding method and a decoding method, where the encoding method and the decoding method are configured to transmit and receive instructions by controlling the mud flow rate during drilling process.

In an embodiment, the encoding method includes the following steps:
  changing, by controlling a mud flow rate control system, the mud flow rate according to a specified sequence, to form a specific mud flow rate pulse sequence in a drilling pipeline to complete transmission of a downlink instruction;
  where the downlink instructions include: a synchronization header, a command code, a data length, a data segment, and an even parity bit.

In an embodiment, the synchronization header is composed of an encoding pattern of "0"+"1"+"0"+"1"+"0"+"1", where "0" and "1" each represent a single bit duration.

In an embodiment, the command code uses lower 3 bits for encoding to represent different instructions meanings, with a highest bit always being "0" to prevent confusion with a last bit of the synchronization header.

In an embodiment, the decoding method includes the following steps:
  real-time collecting, by a mud flow rate measurement device installed downhole, the mud flow rate data (i.e., data of mud flow rate), and processing the data to identify a mud flow rate pulse sequence;
  identifying a synchronization header, that is, detecting a continuous pulse sequence of "0"+"1"+"0"+"1"+"0"+"1", which serves as a starting point for decoding;
  calculating durations of "0" and "1" states in the synchronization header, obtaining an average value of the durations of the "0" and "1" states in the synchronization header, and using 90% and 110% of the average value as interval standard for judging pulse widths of subsequent data segment symbols;
  comparing, by a voltage change rate-based symbol judgment method, relative changes of average values of the mud flow rate over continuous time periods, to determine a "0" or "1" state of each bit in a data segment; and
  parsing, based on a decoded data segment and known encoding rules, specific content of the downlink instructions, and performing verification to ensure correctness of the downlink instructions.

In an embodiment, the voltage change rate-based symbol judgment method includes:
  continuously performing an operation of collecting voltage values every 50 ms downhole and calculating an average value from 10 collected voltage values over 500 ms as a set, comparing an average value of a current set with an average value of a previous set, when the average value of the current set is greater than or less than the average value of the previous set by 10%, determining the current set as a valid set; increasing a counter value counter_1 by 1 in response to the average value of the current set being greater than the average value of the previous set; and increasing a counter value counter_0 by 1 in response to the average value of the current set being less than the average value of the previous set; then, continuing to compare an average value of a next set with the average value of the current set, and making the judgment in the same way to complete the counting for the counters counter_1 and counter_0 (i.e., when the average value of the next set is greater than or less than the average value of the current set by 10%, determining the next set as a valid set; increasing the counter value counter_1 by 1 in response to the average value of the next set being greater than the average value of the current set; and increasing the counter value counter_0 by 1 in response to the average value of the next set being less than the average value of the current set); when the counter value is increased continuously for 3 times, that is, the counter value counter_0 is greater than or equal to 3 or the counter value counter_1 is greater than or equal to 3, determining a symbol transition.

Compared to the related art, the disclosure has the following advantages.

(1) The disclosure designs a brand-new frame structure, including a synchronization header, a command code, a data header (i.e., data length), a data segment, and an even parity bit, to complete the encoding of downlink instructions.

(2) The disclosure defines a synchronization header with symbols of "010101" and determines a pulse width of a single symbol during the synchronization header decoding phase, providing a pulse width timing standard for the decoding of subsequent data, effectively avoiding decoding failures caused by the pulse width counting timing errors.

(3) The disclosure does not require a fixed threshold of voltage as the judgment standard for "0" and "1" symbols, but uses the voltage change rate as the standard for judging the level transition, avoiding decoding failures caused by the inability of voltage sampling values to reach a fixed threshold after well depth is increased.

(4) By using the frame structure of the disclosure and the judgment method for "0" and "1" symbols, the pulse width of a single symbol does not need to adopt the traditional duration of 8 seconds, and can be further reduced to 4 seconds, and the downlink time of the instructions can be shortened to half that of the related art.

BRIEF DESCRIPTION OF DRAWING

The drawing generally illustrates various embodiments by way of example and not by way of limitation, and is used in conjunction with the specification and the claims to describe the embodiments of the disclosure. Where appropriate, the same reference numbers are used in the drawing to denote the same or similar parts. Such embodiments are illustrative and are not intended to be exhaustive or exclusive of the device or method.

DETAILED DESCRIPTION OF EMBODIMENTS

Figure 1:
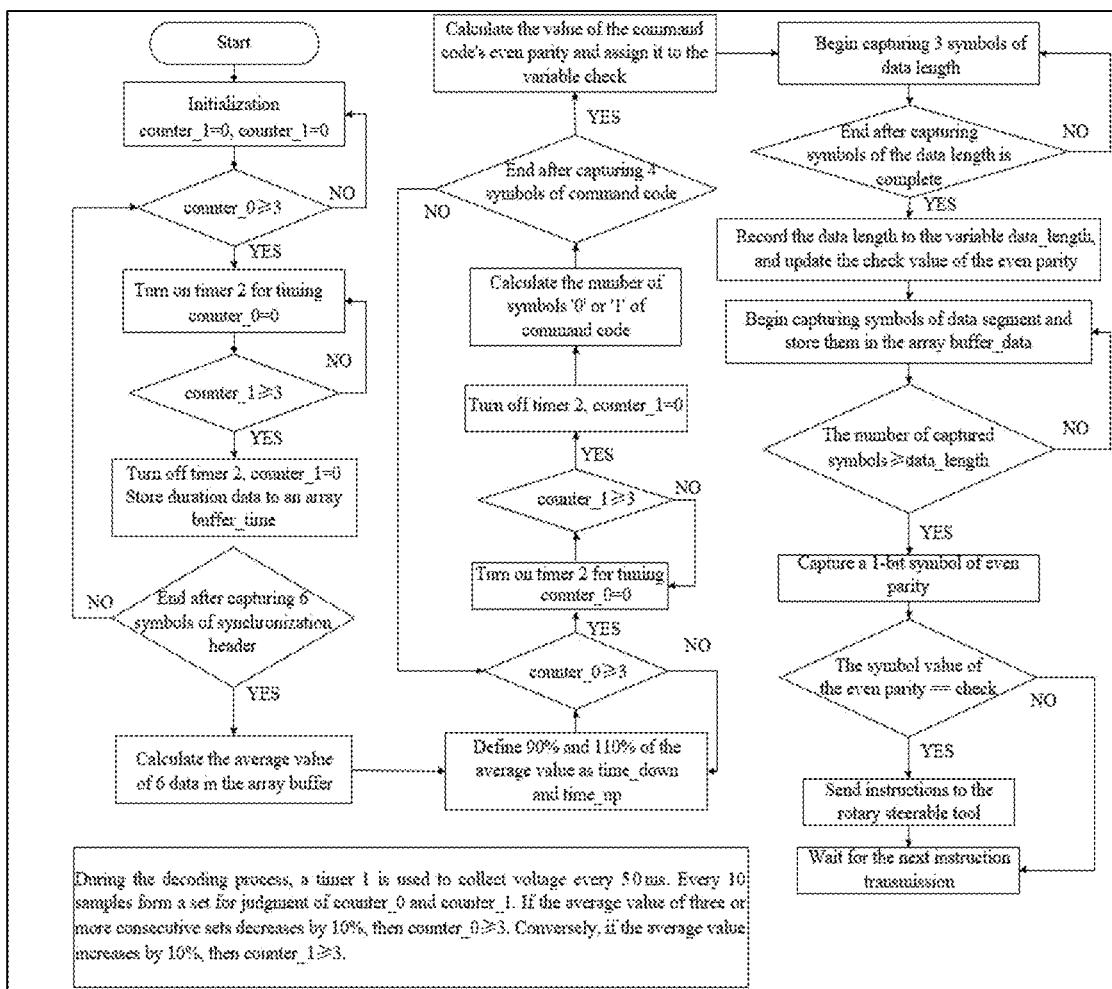
FIG. 1 illustrates a flowchart of a complete decoding method of downlink instructions of the disclosure.
Figure 2:
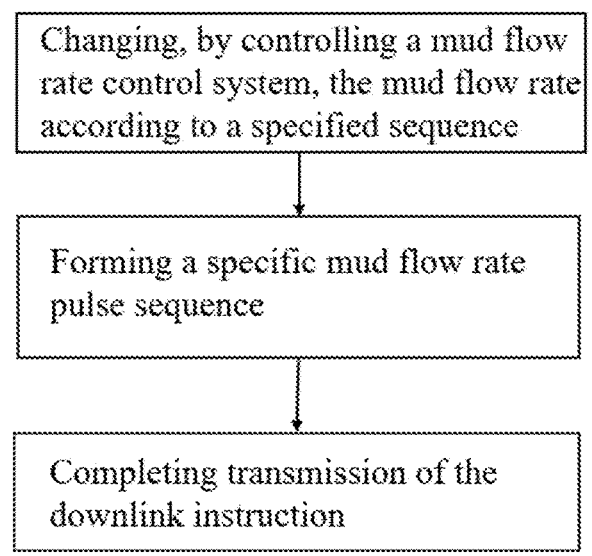
FIG. 2 illustrates a flowchart of an encoding method of the downlink instructions of the disclosure.

It should be noted that, without conflict, the embodiments and features within the embodiments in the disclosure can be combined with each other. The following will provide a detailed description of the disclosure with reference to the drawing and in conjunction with the embodiments.

A complete decoding process of downlink instructions of the disclosure is as follows.

S1, before downlink instructions start, mud flow rate is relatively stable, and an amplitude of an output voltage of a turbine generator doesn't change much. Voltage values are continuously collected, average values of the voltage values are calculated and compared, and counting is performed when a condition for counter_0 to be incremented by 1 is met.

S2, when the counter_0 is greater than or equal to 3, the downlink instructions are considered to start. When a first symbol "0" of a synchronization header is captured, the counter_0 is reset to zero and increment operation of the counter_0 is ceased. Voltage continues to be collected for comparison, and counting is performed when a condition for counter_1 to be incremented by 1 is met. Simultaneously, a timer is started to time (i.e., record the time), and a pulse width duration of the first symbol "0" of the synchronization header is recorded and stored.

S3, when the counter_1 is greater than or equal to 3, it is considered that a second symbol "1" of the synchronization header is captured. The counter_1 is reset to zero and the increment operation of the counter_1 is ceased, the voltage continues to be collected for comparison, and counting is performed when the condition for the counter_0 to be incremented by 1 is met. Simultaneously, the timer is started to time (i.e., record the time), and a pulse width duration of the second symbol "1" of the synchronization header is recorded and stored.

S4, the above S2 and S3 are repeated until a capture of 6-bit symbols of the synchronization header is completed. An average of 6 pulse widths saved from the aforementioned steps is calculated. 90% of the average is recorded as time_down, and 110% of the average is recorded as time_up. An interval [time_down, time_up] is used as a standard for judging pulse widths of subsequent data segment symbols.

S5, when the counter_0 is greater than or equal to 3, a first symbol "0" of a command code is captured, and the timer is started to time. At the same time, the counter_0 is reset to zero and the increment operation of the counter_0 is ceased. The voltage continues to be collected for comparison, and counting is performed when the condition for the counter_1 to be incremented by 1 is met.

S6, until the counter_1 is greater than or equal to 3, the timer stops, and total counting time is recorded as time_total. The number of symbols "0" is determined based on the pulse width judgment interval obtained in the S4. The number of symbols "0" is the integer within an interval [time_total/time_up, time_total/time_down]. At the same time, the counter_1 is reset to zero and the increment operation of the counter_1 is ceased. The voltage continues to be collected for comparison, and counting is performed when the condition for the counter_0 to be incremented by 1 is met.

S7, the above S5 and S6 are repeated until a capture of 4-bit symbols of the command code is completed, and an even parity value is calculated and stored in a variable check.

S8, the 3-bit symbol of a data length is captured, by using the same method as capturing the synchronization header and the command code. A subsequent data length data_length is obtained, and the even parity value check is updated.

S9, the N-bit symbol of a data segment is captured, by using the same method as capturing the synchronization header and the command code. When the number of captured symbols equals the data length data_length obtained in S8, a capture of the symbols of the data segment is completed.

S10, a 1-bit symbol of the even parity is captured and determined whether it is equal to the check value. If it is equal to the check value, the decoding is successful, and instructions are sent to the rotary steerable system. Otherwise, the decoding fails and returns to S1.

To address an issue of difficulty in counting pulse widths with the related art, the encoding pattern of the synchronization header in the disclosure is "0"+"1"+"0"+"1"+"0"+"1". The duration corresponding to "0" and "1" in the synchronization header is consistent with the data segment, each representing the single-bit symbol duration. Using an alternating encoding pattern of 3 sets of "0" and "1" generates pulse widths of 6 single-bit symbols. These pulse widths of the 6 single-bit symbols are collected as samples to calculate the average value, and 90% and 110% of the average value are used as the interval standard for judging the pulse width of subsequent data segment symbols for decoding the downlink data.

To address an issue that the related art of using a fixed threshold to judge the downlink instructions can easily lead to decoding failures, the disclosure eliminates the need to select the fixed threshold as a criterion for judging "0" and "1" symbols, uses the voltage change rate for judgment instead. The specific method is as follows: a voltage value is collected once every 50 ms downhole, and the average value is calculated from 10 collection values over a period of 500 ms as a set, this operation is continuously performed, and the average value of the current set is compared with the average value of the previous set. If the average value of the current set is greater than or less than 10% of the average value of the previous set, it is considered a valid set, and if it is greater than 10% of the average value of the previous set, the count value counter_1 is incremented by 1, and if it is less than 10% of the average value of the previous set, the count value counter_0 is incremented by 1. Then, the average value of the next set continues to compare with the average value of the current set and makes judgments in the same way, and the counting of the counter_1 and the counter_0 is completed.

When the count value is incremented continuously for 3 times, that is, when the counter_0 is greater than or equal to 3 or the counter_1 is greater than or equal to 3, it is considered that the symbols of the downlink instructions have undergone a change from "1" to "0" or from "0" to "1". At this point, sampling of the symbol "0" or "1" is initiated in conjunction with the pulse width judgment standard. It should be noted that the counter_0 and the counter_1 must meet the increment condition continuously for three times to proceed to the next step; if there is any instance where the condition is not met, they must be reset to zero and start over.

A downlink instruction frame structure of the disclosure is shown in a table below. The command code represents the specific meaning of the downlink instructions, including a total of 7 types. The low 3 bits are encoded from 0 to 7, representing the following respectively: start guidance, start stabilization deviation, set guidance direction, set guidance resultant force, set target well deviation, set deviation force, and set torque direction force. The highest bit of the command code is always "0", facilitating the decoding of the data segment after the synchronization header is decoded, to avoid the highest bit of the command code and the last bit of the synchronization header being "1" at the same time. The 3-bit data length indicates the total number of bits for the data segment N plus the last even parity bit, with 0 indicating a length of 2, 1 indicating a length of 4, . . . , and 7 indicating a length of 16. The number of data segment and their meanings are determined by the rotary steerable system.

| Type | Synchronization header '010101' | Command code | Data length | Data segment | Even parity |
|---|---|---|---|---|---|
| Digit | 6 | 4 | 3 | N | 1 |

The above description is merely a preferred embodiment of the disclosure, but the scope of protection of the disclosure is not limited thereto. Any person skilled in the art, within the technical scope disclosed by the disclosure, shall be covered within the scope of protection of the disclosure when making equivalent substitutions or modifications according to the technical solution and inventive concept of the disclosure.

What is claimed is:

1. A method of encoding and decoding a downlink instruction based on mud flow rate, comprising: an encoding method and a decoding method, wherein the encoding method and the decoding method are for transmitting and receiving instructions by controlling the mud flow rate during drilling process;

wherein the decoding method comprises the following steps:

S1, when the downlink instruction is not started, continuously collecting voltage values, calculating and comparing average values of the voltage values, and performing counting when a condition for counter_0 to be incremented by 1 is met, wherein the condition for the counter_0 to be incremented by 1 is met when an average value of a current set of 10 collected voltage values is less than 10% of an average value of a previous set of 10 collected voltage values;

S2, starting the downlink instruction when the counter_0 is greater than or equal to 3, capturing a first symbol "0" of a synchronization header, resetting the counter_0 to zero and ceasing an increment operation of the counter_0, continuously collecting the voltage values for comparison, performing counting when a condition for counter_1 to be incremented by 1 is met, simultaneously starting a timer to record a time, and recording and storing a pulse width duration of the first symbol "0" of the synchronization header, wherein the condition for the counter_1 to be incremented by 1 is met when the average value of the current set of 10 collected voltage values is greater than 10% of the average value of the previous set of 10 collected voltage values;

S3, capturing a second symbol "1" of the synchronization header when the counter_1 is greater than or equal to 3, resetting the counter_1 to zero and ceasing an increment operation of the counter_1, continuously collecting the voltage values for comparison, performing counting when the condition for the counter_0 to be incremented by 1 is met, simultaneously starting the timer to record the time, and recording and storing a pulse width duration of the second symbol "1" of the synchronization header;

S4, repeating the above S2 and S3 until a capture of 6-bit symbols of the synchronization header is completed, calculating an average of 6 pulse widths saved from the aforementioned steps, recording 90% of the average of the 6 pulse widths as time_down and 110% of the average of the 6 pulse widths as time_up, and using an interval [time_down, time_up] as a pulse width judgment interval for subsequent data segment symbols;

S5, based on a voltage change rate-based symbol judgment method, determining a "0" or "1" state of each bit in a data segment by comparing relative changes of average values of the mud flow rate over continuous time periods, capturing a first symbol "0" of a command code when the counter_0 is greater than or equal to 3, starting the timer to record the time, simultaneously resetting the counter_0 to zero and ceasing the increment operation of the counter_0, continuously collecting the voltage values for comparison, and performing counting when the condition for the counter_1 to be incremented by 1 is met;

S6, stopping the timer until the counter_1 is greater than or equal to 3, recording a total counting time as time_total, determining a number of symbols "0" of the command code based on the pulse width judgment interval obtained in S4, where the number of the symbols "0" of the command code is an integer within an interval [time_total/time_up, time_total/time_down]; and simultaneously resetting the counter_1 to zero and ceasing the increment operation of the counter_1, continuously collecting the voltage values for comparison, and performing counting when the condition for the counter_0 to be incremented by 1 is met;

S7, repeating the above S5 and S6 until a capture of 4-bit symbols of the command code is completed, and calculating an even parity value;

S8, capturing 3-bit symbols of a data length to obtain a subsequent data length, and updating the even parity value; wherein the capturing the 3-bit symbols of the data length to obtain the subsequent data length comprises:
  S81, capturing a first symbol of the data length when the counter_0 or the counter_1 is greater than or equal to 3, starting the timer to record the time, simultaneously resetting the counter_0 or the counter_1 to zero and ceasing the increment operation of the counter_0 or the counter_1, continuously collecting the voltage values for comparison, and performing counting when the condition for the counter_1 or the counter_0 to be incremented by 1 is met;
  S82, stopping the timer until the counter_1 or the counter_0 is greater than or equal to 3, recording the total counting time as the time_total, determining a number of symbols "0" or "1" of the data length based on the pulse width judgment interval obtained in S4, where the number of the symbols "0" or "1" of the data length is an integer within the interval [time_total/time_up, time_total/time_down]; and simultaneously resetting the counter_1 or the counter_0 to zero and ceasing the increment operation of the counter_1 or the counter_0, continuously collecting the voltage values for comparison, and performing counting when the condition for the counter_0 or the counter_1 to be incremented by 1 is met; and
  S83, repeating the above S81 and S82 until a capture of the 3-bit symbols of the data length is completed;

S9, capturing N-bit symbols of the data segment, and completing a capture of the symbols of the data segment when a number of captured symbols is equal to the subsequent data length obtained in S8; wherein the capturing the N-bit symbols of the data segment comprises:
  S91, capturing a first symbol of the data segment when the counter_0 or the counter_1 is greater than or equal to 3, starting the timer to record the time, simultaneously resetting the counter_0 or the counter_1 to zero and ceasing the increment operation of the counter_0 or the counter_1, continuously collecting the voltage values for comparison, and performing counting when the condition for the counter_1 or the counter_0 to be incremented by 1 is met;
  S92, stopping the timer until the counter_1 or the counter_0 is greater than or equal to 3, recording the total counting time as the time_total, determining a number of symbols "0" or "1" of the data length based on the pulse width judgment interval obtained in S4, where the number of the symbols "0" or "1" of the data length is an integer within the interval [time_total/time_up, time_total/time_down]; and simultaneously resetting the counter_1 or the counter_0 to zero and ceasing the increment operation of the counter_1 or the counter_0, continuously collecting the voltage values for comparison, and performing counting when the condition for the counter_0 or the counter_1 to be incremented by 1 is met; and
  S93, repeating the above S91 and S92 until a capture of the N-bit symbols of the data segment is completed; and S10, capturing a 1-bit symbol of an even parity bit, and determining whether the 1-bit symbol of the even parity bit is equal to the even parity value; and sending the instructions to a rotary steerable system when the 1-bit symbol of the even parity bit is equal to the even parity value, and returning to S1 when the 1-bit symbol of the even parity bit is not equal to the even parity value;

wherein the voltage change rate-based symbol judgment method comprises:
  continuously performing an operation of collecting the voltage values every 50 milliseconds (ms) downhole and calculating an average value from 10 collected voltage values over 500 ms as a set;
  comparing the average value of the current set with the average value of the previous set:
    when the average value of the current set is greater than or less than the average value of the previous set by 10%, determining the current set as a valid set; increasing the counter_1 by 1 in response to the average value of the current set being greater than the average value of the previous set; and increasing the counter_0 by 1 in response to the average value of the current set being less than the average value of the previous set;
  comparing an average value of a next set with the average value of the current set:
    when the average value of the next set is greater than or less than the average value of the current set by 10%, determining the next set as a valid set; increasing the counter_1 by 1 in response to the average value of the next set being greater than the average value of the current set; and increasing the counter_0 by 1 in response to the average value of the next set being less than the average value of the current set; and when the counter_0 or the counter_1 is increased continuously for 3 times, that is, the counter_0 is greater than or equal to 3 or the counter_1 is greater than or equal to 3, determining a symbol transition.

2. The method of encoding and decoding the downlink instruction based on the mud flow rate as claimed in claim 1, wherein the encoding method comprises the following steps:

changing, by controlling a mud flow rate control system, the mud flow rate according to a specified sequence, to form a specific mud flow rate pulse sequence in a drilling pipeline to complete transmission of the downlink instruction; and wherein the downlink instruction comprises: the synchronization header, the command code, the data length, the data segment, and the even parity bit.

3. The method of encoding and decoding the downlink instruction based on the mud flow rate as claimed in claim 2, wherein the synchronization header is composed of an encoding pattern of "0"+"1"+"0"+"1"+"0"+"1", where "0" and "1" each represent a single bit duration.

4. The method of encoding and decoding the downlink instruction based on the mud flow rate as claimed in claim 2, wherein the command code uses lower 3 bits for encoding to represent different instructions meanings, with a highest bit always being "0" to prevent confusion with a last bit of the synchronization header.

* * * * *